T. R. Roach.
Revolving Rake.

N° 16025.    Patented Nov. 4, 1856.

UNITED STATES PATENT OFFICE.

THOMAS R. ROACH, OF WEST NEEDHAM, MASSACHUSETTS.

IMPROVEMENT IN HAY-RAKES.

Specification forming part of Letters Patent No. 16,025, dated November 4, 1856.

*To all whom it may concern:*

Be it known that I, THOMAS R. ROACH, of West Needham, in the county of Norfolk and State of Massachusetts, have invented certain new and useful Improvements in Revolving Horse-Rakes, of which the following is a full, clear, and exact description, reference being had to the accompanying drawings, making part of this specification, in which—

Figure 1:
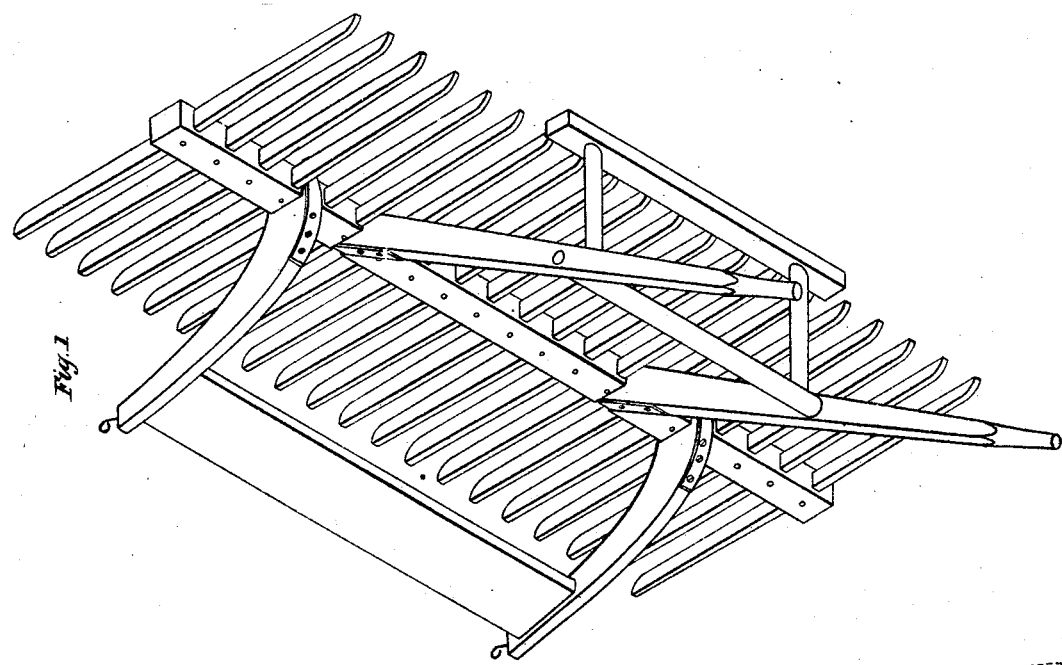
Figure 3:
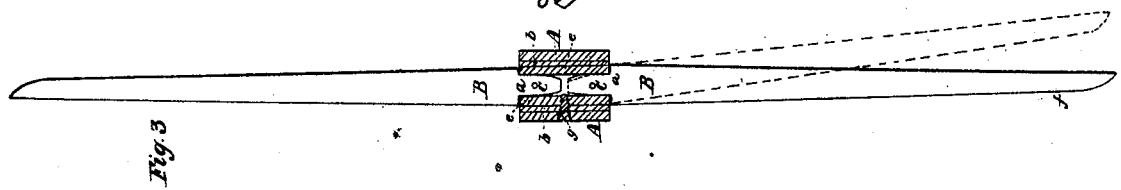
Figure 2:
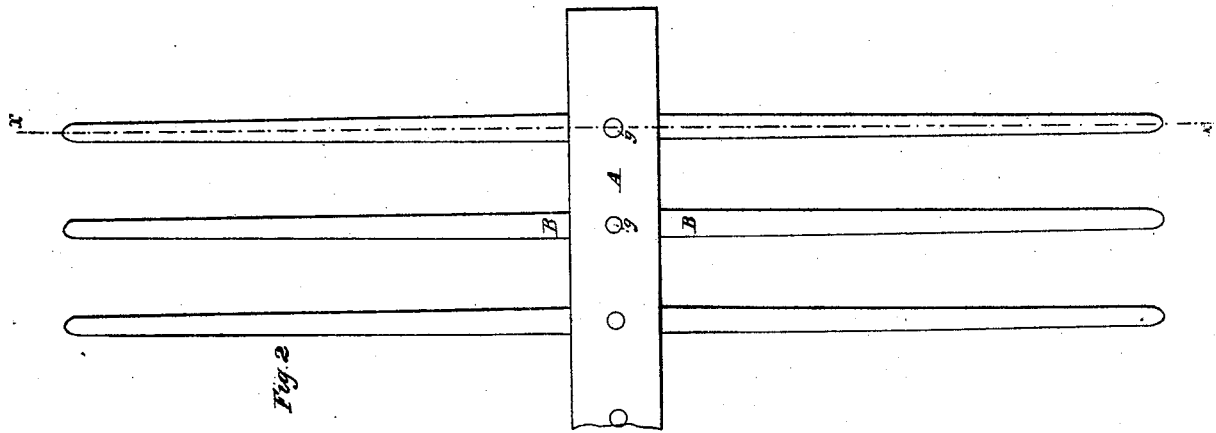

Figure 1 is a perspective view of the kind of hay-rake to which my improvement is particularly applicable; Fig. 2, a plan of a portion of the bar to which the teeth are attached; Fig. 3, a section taken transversely through the bar and longitudinally through two of the teeth upon the line $x$ $x$ of Fig. 2.

In those hay and grain rakes drawn by horse, which turn over to discharge their load, and are known as "revolving horse-rakes," the principal objection has been found to be that, from their rigidity, they cannot accommodate themselves to the uneven surface of the ground over which they are drawn.

The object of my improvement is to overcome this objection, and to make a revolving hay-rake the teeth of which by rising and falling vertically at their points independently of each other can accommodate themselves to any unevenness of the surface over which they pass, and thus gather the hay or grain much better than can be done by the ordinary revolving rake now in general use.

To enable others skilled in the art to understand my invention, I will proceed to describe the manner in which I have carried out the same.

The draft-bars to which the horse is attached and the handles and catches by which the rake is guided and revolved when full on one side being the same as those in general use on this class of revolving rakes, (one of such rakes being shown in Fig. 1,) they need not be here described.

A is the tooth-bar; B, the teeth, which are cut away at the end next the bar, as seen at $a$, Fig. 3.

$b$ is a cast-iron or other suitable metallic socket or box, into the ends of which the teeth are inserted and secured by a pin, $c$, on which they vibrate a short distance.

$e$ are strips of india-rubber, or other suitable elastic material, inserted between the smaller portion $a$ of the teeth and the box $b$, both above and below the teeth.

The method of arranging and securing the teeth is as follows: The strips of india-rubber $e$, cut to fit in the box $b$, are placed within it, one at top and one at the bottom of the box. The portion $a$ of a tooth is inserted between the two strips of india-rubber, one tooth at each end of the box, and are there secured by pins $c$ passing through the sides of the box and through the teeth. When the teeth are thus secured in pairs the box $b$ is entered lengthwise into a mortise in the bar A, and is there secured by a screw, $g$, or in any suitable manner, each pair of teeth occupying the position shown in Fig. 2. This arrangement allows to the teeth a certain vertical play above and below a plane passing longitudinally through the middle of the teeth. Thus, as the rake is drawn over the surface of the ground in a direction transverse to the length of the bar A, the point of a tooth (the points being beveled, as at $f$, Fig. 3) meeting any obstruction—such as a stone or hassock of grass—will rise, as shown in red in Fig. 3, and pass over it without lifting up the adjoining teeth from the ground and rendering them inefficient, and when the rake is passing over a furrow or hole in the ground, the front ends of the teeth being always pressed down onto the surface by the person guiding the rake, the tooth or teeth which may be immediately in line with such furrow or hole will by the action of the springs in the socket be caused to drop into the indentation in the surface of the ground and gather out of it any hay or grain that may have lodged there.

As in most parts of this country it is customary to plow the field previous to sowing it with grain and grass seed "in lands," as they are termed, consisting of alternate ridges and open furrows, the ordinary rigid-toothed revolving rake will not operate in an efficient manner when drawn in the direction in which the field was plowed, or lengthwise of the furrows, for when passing along a furrow a portion of the teeth only will gather, those immediately over the furrow passing over the grain or grass, and when being drawn along a ridge the same will be the effect. These difficulties, which necessitate its being drawn across the furrows and ridges, (which does not always suit the position in which the swarths are laid,) are obviated by my improvement, which gives to the teeth of the rake such a vertical play and elasticity of movement as enables them to accommodate themselves to any moderate inequalities in the surface of the land.

In the above description I have spoken only of the use of india-rubber springs. Other kinds of springs may be made to answer the purpose; but the one above described is that which I prefer.

What I claim as my invention, and desire to secure by Letters Patent, is—

The springs above and below the teeth, operating in the manner and for the purpose substantially as herein set forth.

THOS. R. ROACH.

Witnesses:
P. E. TESCHEMACHER,
SAM. COOPER.